(12) United States Patent
Nader et al.

(10) Patent No.: US 7,220,085 B2
(45) Date of Patent: May 22, 2007

(54) UNIVERSAL JIG/WORK HOLDING FIXTURE AND METHOD OF USE

(75) Inventors: Gregg A. Nader, Libertyville, IL (US); Donald G. Parrott, Alstead, NH (US)

(73) Assignee: Sonnax Industries, Inc., Bellows Falls, VT (US)

( * ) Notice: Subject to any disclaimer, the term of this patent is extended or adjusted under 35 U.S.C. 154(b) by 421 days.

(21) Appl. No.: 10/944,232

(22) Filed: Sep. 17, 2004

(65) Prior Publication Data

US 2006/0104729 A1   May 18, 2006

Related U.S. Application Data

(60) Provisional application No. 60/504,467, filed on Sep. 17, 2003.

(51) Int. Cl.
   *B23B 35/00*   (2006.01)
   *B23B 47/28*   (2006.01)

(52) U.S. Cl. .................. 408/1 R; 408/75; 408/72 B; 408/103; 408/115 R; 408/236

(58) Field of Classification Search ........... 408/1 R, 408/75, 79, 72 B, 103, 115 B, 155 R, 236, 408/241 B, 237
   See application file for complete search history.

(56) References Cited

U.S. PATENT DOCUMENTS

| | | | | | |
|---|---|---|---|---|---|
| 2,260,784 A | * | 10/1941 | Morton | ................ | 408/103 |
| 2,629,411 A | * | 2/1953 | Jones | ................ | 144/84 |
| 2,740,308 A | * | 4/1956 | Blanchard | ................ | 408/72 R |
| 2,824,470 A | * | 2/1958 | Groves | ................ | 408/103 |
| 2,934,979 A | * | 5/1960 | Hartje | ................ | 408/103 |
| 3,764,204 A | * | 10/1973 | Kammeraad | ................ | 408/75 |
| 4,093,394 A | * | 6/1978 | Adams | ................ | 408/103 |
| 4,227,826 A | * | 10/1980 | Conrad | ................ | 403/371 |
| 4,243,083 A | * | 1/1981 | Serrano | ................ | 144/35.2 |
| 4,365,917 A | * | 12/1982 | Harmand | ................ | 409/201 |
| 4,899,458 A | * | 2/1990 | Minelli | ................ | 33/644 |
| 5,281,057 A | * | 1/1994 | Ritt | ................ | 408/75 |
| 5,302,057 A | * | 4/1994 | Siegfried | ................ | 408/1 R |

* cited by examiner

*Primary Examiner*—Daniel W. Howell
(74) *Attorney, Agent, or Firm*—Clifford F. Rey

(57) ABSTRACT

A universal jig/work holding fixture for precision manual reaming of valve bores within a transmission valve body, or other work piece is disclosed. The universal jig/work holding fixture includes a tool holder (i.e. jig) having universal swiveling movement in all axes, which allows precise axial alignment of a reaming tool to the longitudinal axis of a valve bore. The universal jig is contained within a work holding fixture whereon the valve body or other work piece is clamped during the reaming operation. The work holding fixture is constructed to accommodate vertical and lateral adjustment of the tool holder relative to the work holding fixture to permit precise alignment of the reaming tool and provides mechanisms to lock the tool holder and work piece in a desired position. The universal jig/work holding fixture allows a service technician in a transmission shop environment to achieve a precision repair using only manual tools.

24 Claims, 9 Drawing Sheets

UNIVERSAL JIG/WORK HOLDING FIXTURE AND METHOD OF USE

CROSS-REFERENCE TO RELATED APPLICATION

This application claims the benefit under 35 U.S.C. 119(e) of U.S. Provisional Patent Application No. 60/504,467 filed Sep. 17, 2003 entitled Universal Jig/Work Holding Fixture.

BACKGROUND OF INVENTION

The present invention relates to automatic transmissions for land vehicles and, more particularly, to a universal jig/work holding fixture and reaming method for the repair of worn valve bodies and pumps of FORD, GENERAL MOTORS, and other similar automatic transmissions.

Automatic transmission systems of the prior art have a hydraulic circuit subsystem which includes at least a hydraulic pump, a valve body having fluid conducting passages or circuits, input and exhaust ports formed within the fluid circuits, and a plurality of spool valves so-called because of their resemblance to sewing-thread type spools. Such spool valves are comprised of generally cylindrical pistons having control diameters or lands formed thereon, which alternately open and close the ports to fluid circuits for regulating the flow and pressure of automatic transmission fluid (hereinafter "ATF") within the transmission.

Such spool valves must often be replaced or refurbished during service procedures due to mechanical wear. If wear is extreme the cylindrical bores in the valve body wherein such valves are located must be machined oversize to a close tolerance to accommodate an oversize valve or a replacement valve fitted with a mating sleeve, which is installed in the oversize bore. Providing a leak proof seal between the mating surfaces of the oversize valve and/or sleeve and the valve body to prevent cross-leakage between hydraulic passages which adjoin the replacement valve is critical to salvaging a worn original equipment (hereinafter "OE") valve body.

A significant problem is presented to the service technician in obtaining this close tolerance fit in a typical transmission repair shop using only manual tools. Thus, the present invention has been developed to resolve this problem and other shortcomings of the prior art.

SUMMARY OF THE INVENTION

Accordingly, the present invention provides a universal jig/work holding fixture for precision manual reaming of valve bores within an OE valve body or pump, which can be achieved by a service technician in a repair shop environment. This is accomplished with the present jig/holding fixture by axial alignment of a reaming tool, drill, or other cutting tool to the worn OE bore utilizing a tool holder having universal (i.e. swiveling) movement in all axes, which allows precise axial alignment of the tool to the OE valve bore or pump body. The universal jig is integrated within the work holding fixture whereon the valve body or pump is clamped during the reaming operation.

There has thus been outlined, rather broadly, the important features of the invention in order that the detailed description thereof that follows may be better understood, and in order that the present contribution to the art may be better appreciated. There are additional features of the invention that will be described hereinafter and which will form the subject matter of the claims appended hereto.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
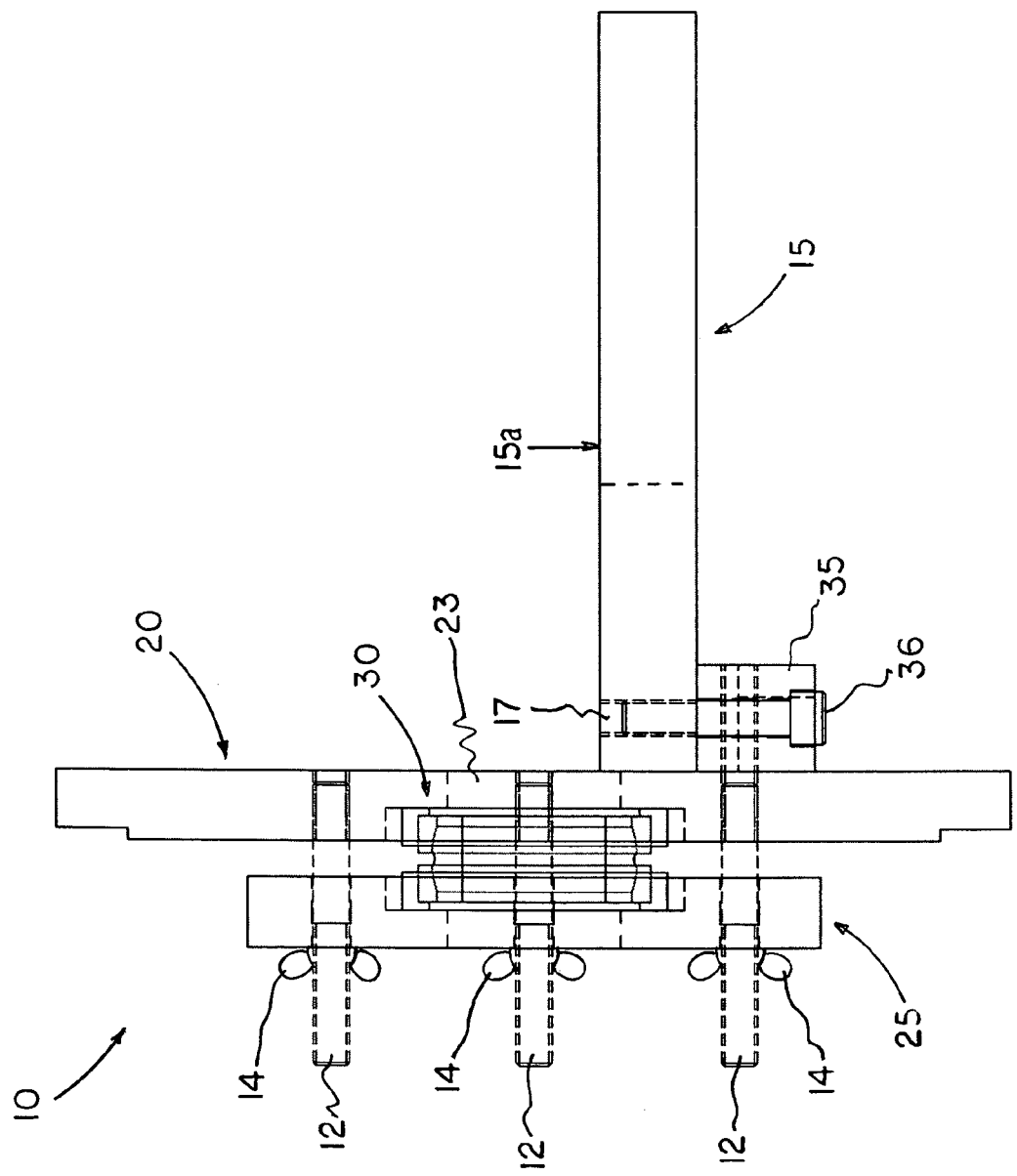
FIG. 1 is a side elevational view of the universal jig/work holding fixture of the present invention.

With further reference to the drawings there is shown therein an embodiment of a universal jig/work holding fixture in accordance with the present invention, indicated generally at 10 and illustrated in FIG. 1. To relieve prolixity in this application, the present universal jig/holding fixture 10 will be described primarily for use in the reaming of valve bores within valve body 50 of an automatic transmission. However, it will be understood that the present jig/fixtures 10, 10' disclosed herein may also be used for reaming of valves bores within a transmission pump (not shown) or other similar work piece wherein a valve resides.

The jig/fixture 10 is an assembly of components, namely, a bed plate or bed, indicated generally at 15, a jig plate, indicated generally at 20, a clamping plate, indicated generally at 25, and a universal tool holder assembly, indicated generally at 30. In the embodiment shown in FIG. 1, a mounting bracket 35 secures bed 15 and jig plate 20 in pivoting relation as explained hereinafter in further detail.

Figure 2:
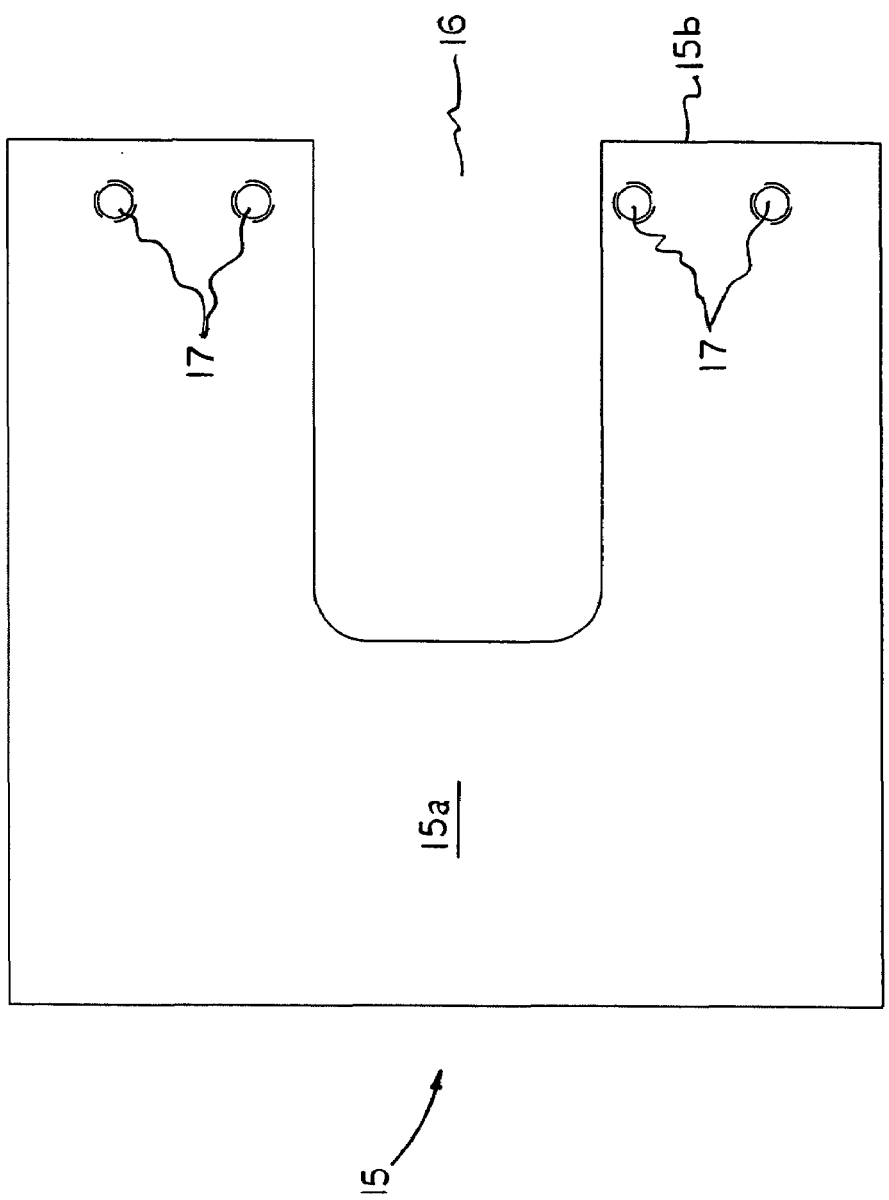
FIG. 2 is a top plan view of the bed plate of the present universal jig/work holding fixture.

As shown in FIG. 2, the bed 15 is a generally rectangular structure having a cutout section 16 formed along its centerline and extending inwardly from a first lateral edge 15b thereof. Cutout section 16 provides access for applying cutting fluid during a reaming process wherein the present invention is utilized. The bed 15 includes a flat, machined surface 15a whereon valve body 50, a transmission pump (not shown), or other work piece is secured during the reaming process.

Figure 3:
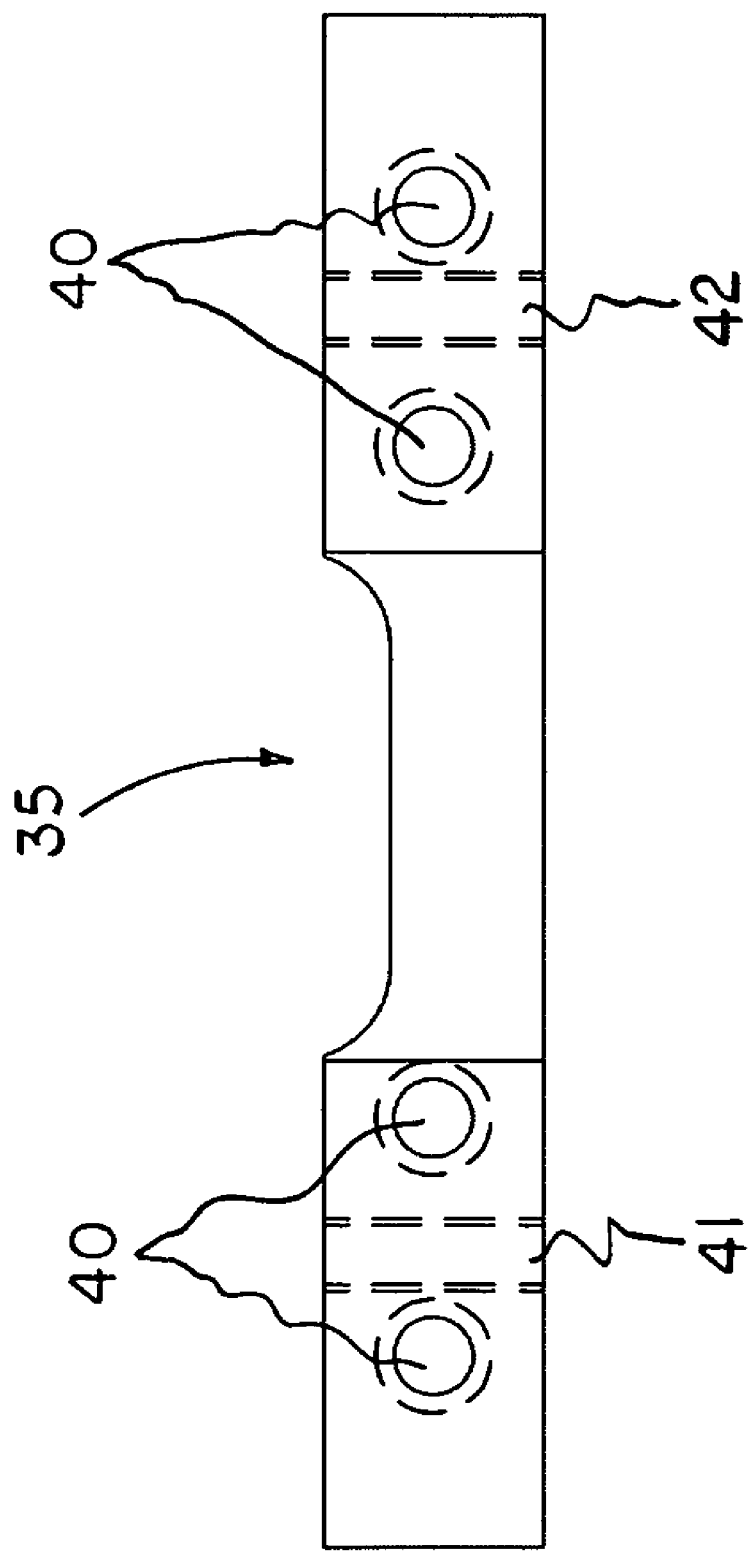
FIG. 3 a is top plan view of the mounting bracket of the present universal jig/work holding fixture.
Figure 8:
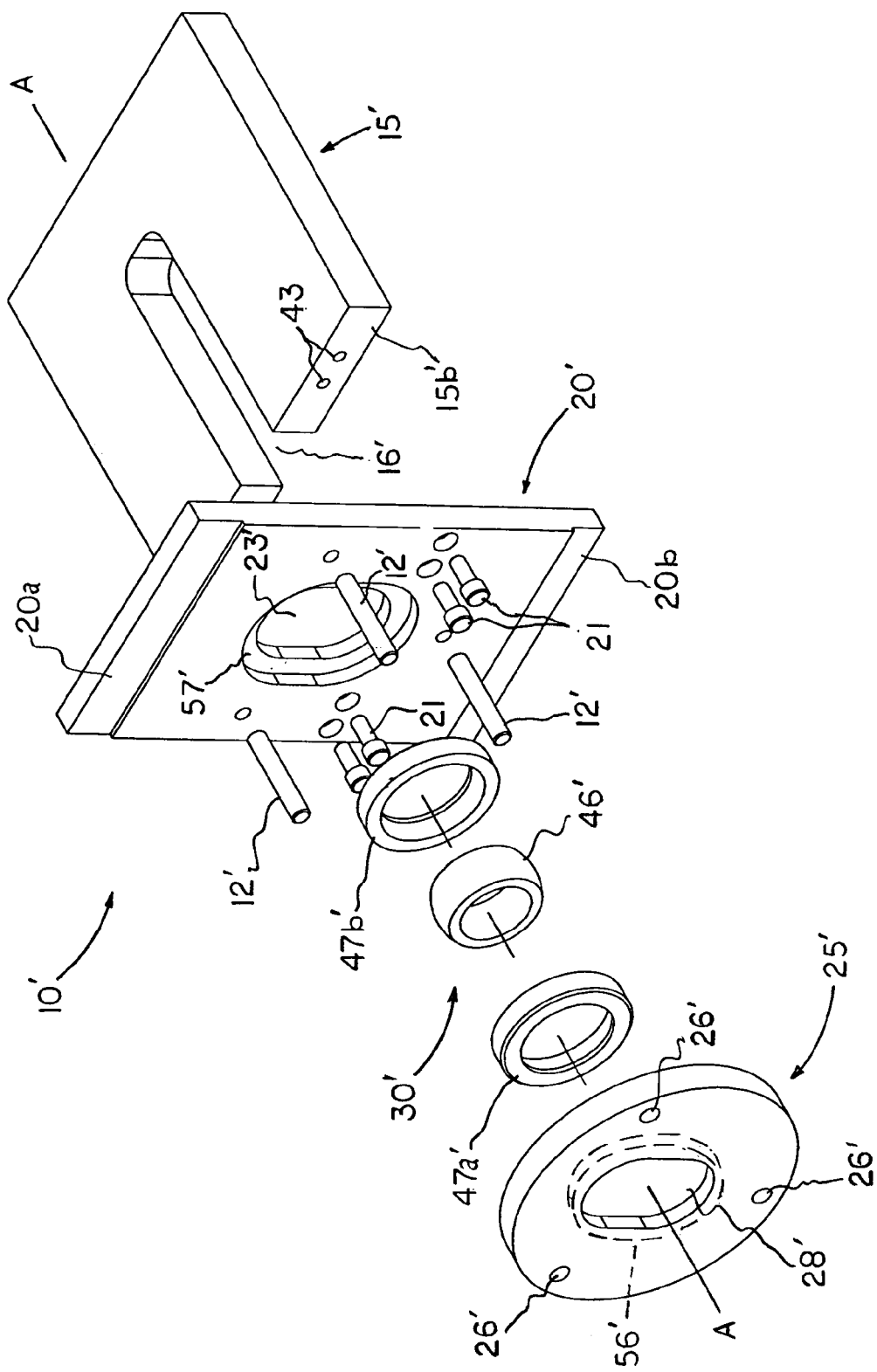
FIG. 8 is an exploded perspective view of another embodiment of the present universal jig/work holding fixture.

As seen in FIG. 3 mounting bracket 35 is an elongated support member, which extends transversely beneath the cutout 16 and along the first lateral edge 15b of the bed 15 (FIG. 2). In the embodiment shown, mounting bracket 35 is mechanically attached to bed 15 by fasteners such as machine screws 36 (FIG. 1), which are installed within through holes 40 (FIG. 3) formed in the bracket 35 and which extend into threaded holes 17 formed in the bed 15. In an alternative embodiment mounting bracket 35 and bed 15 may be formed as a unitary construction (not shown) from a casting or extrusion or bracket 35 may be omitted entirely as shown in the embodiment of FIG. 8.

Figure 4:
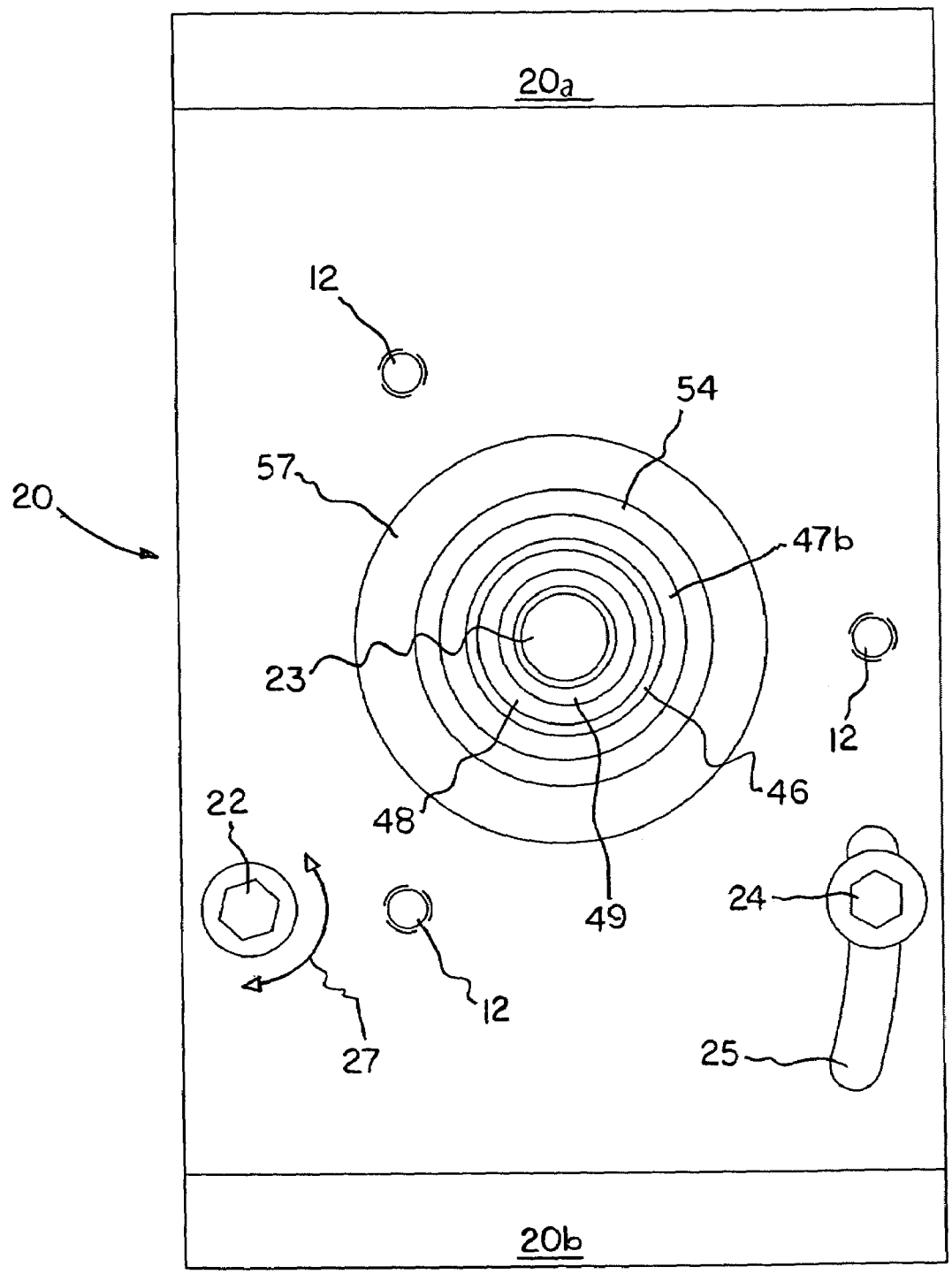
FIG. 4 is a top plan view of the jig plate of the universal jig/work holding fixture.

In the embodiment shown in FIG. 1, jig plate 20 is provided with structures comprising height-adjusting means including, but not limited to, the following structures. Referring to FIG. 4 jig plate 20 is disposed in perpendicular relation to bed 15 and being attached to mounting bracket 35 in pivoting relation about a pivot bolt 22, which extends through a hole (not shown) in the jig plate 20 and is engaged in a threaded hole 41 formed in the mounting bracket 35 (FIG. 3). Jig plate 20 is imparted with limited angular rotation about pivot bolt 22 as indicated by directional arrows 27 by means of a curved slot 25, which extends through the jig plate 20 at the location shown.

Locking bolt 24 extends through slot 25 and is engaged in threaded hole 42 in the bracket 35 (FIG. 3) and tightened to secure the bed 15 at the desired angular orientation relative to jig plate 20. Adjustment of the angular orientation of bed 15 and jig plate 20 in this manner allows the position of a reaming tool 55 to be adjusted to the approximate vertical height of the bore 52 (FIG. 7) in the valve body 50, which is to be reamed oversize. Jig plate 20 is provided with flats 20a, 20b, which provide a clamping surface to permit the assembled jig/work holding fixture 10 to be held in a standard bench vise (not shown). The jig plate 20 also includes a central opening 23 wherein a universal (i.e. swiveling in all axes) tool holder 30 is mounted to receive a reaming tool 55 (FIG. 7).

Figure 5A:
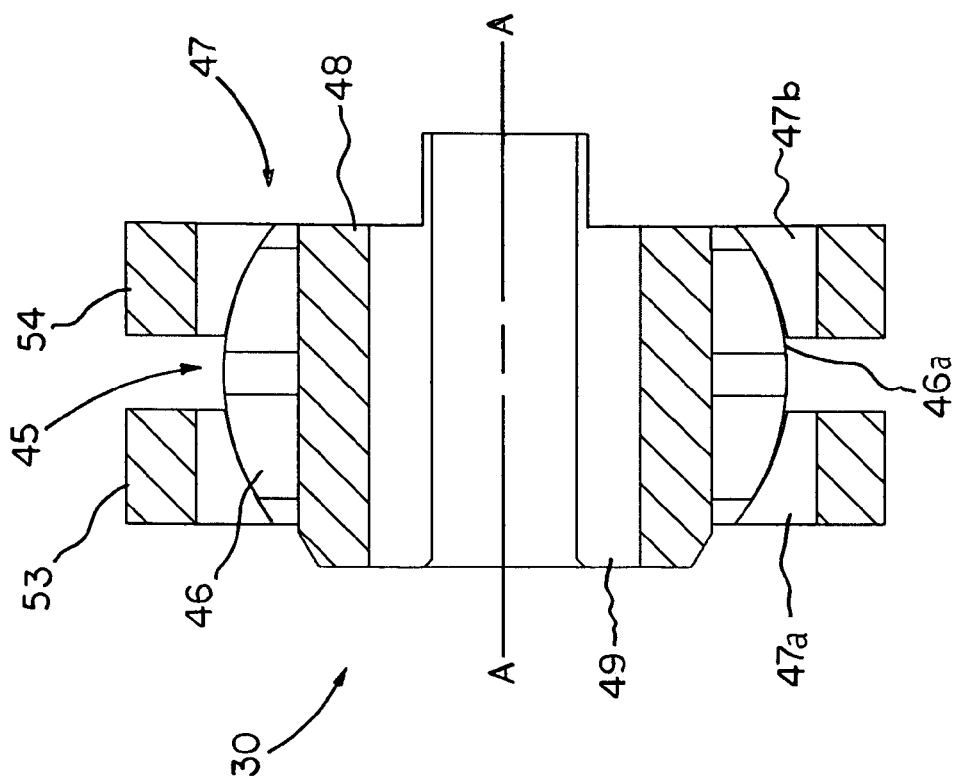
FIG. 5A is a cross-sectional view of one embodiment of the tool holder assembly of the universal jig/work holding fixture including a spherical bearing.

Referring to FIG. 5A, tool holder 30 is comprised of a so-called spherical bearing, indicated generally at 45, which includes an inner bearing element 46 and an outer race, indicated generally at 47, which is cut into half-sections 47a, 47b along the mid-circumferential plane thereof. Half-sections 47a, 47b are press fit into mounting rings 53, 54, which are seated in counterbores 56, 57 (FIGS. 4, 6) formed in clamping plate 25 and jig plate 20 respectively. Mounting rings 53, 54 prevent distortion of the half-sections 47a, 47b of the outer race 47.

In a so-called spherical bearing of the type shown in FIG. 5A, there are no ball bearings or roller elements as are found in a conventional ball bearing or roller bearing assembly. Instead a convex, semi-spherical surface of the inner bearing element 46 engages a mating concave surface of outer race 47 wherein the bearing element 46 is captured. This configuration imparts universal rotation/angular deflection of the bearing element 46 relative to a fixed longitudinal axis -A- of the outer race 47. A spherical bearing manufactured by Torrington Company, Torrington, Conn., and identified by Part No. 15SF24 is suitable for this purpose.

Figure 7:
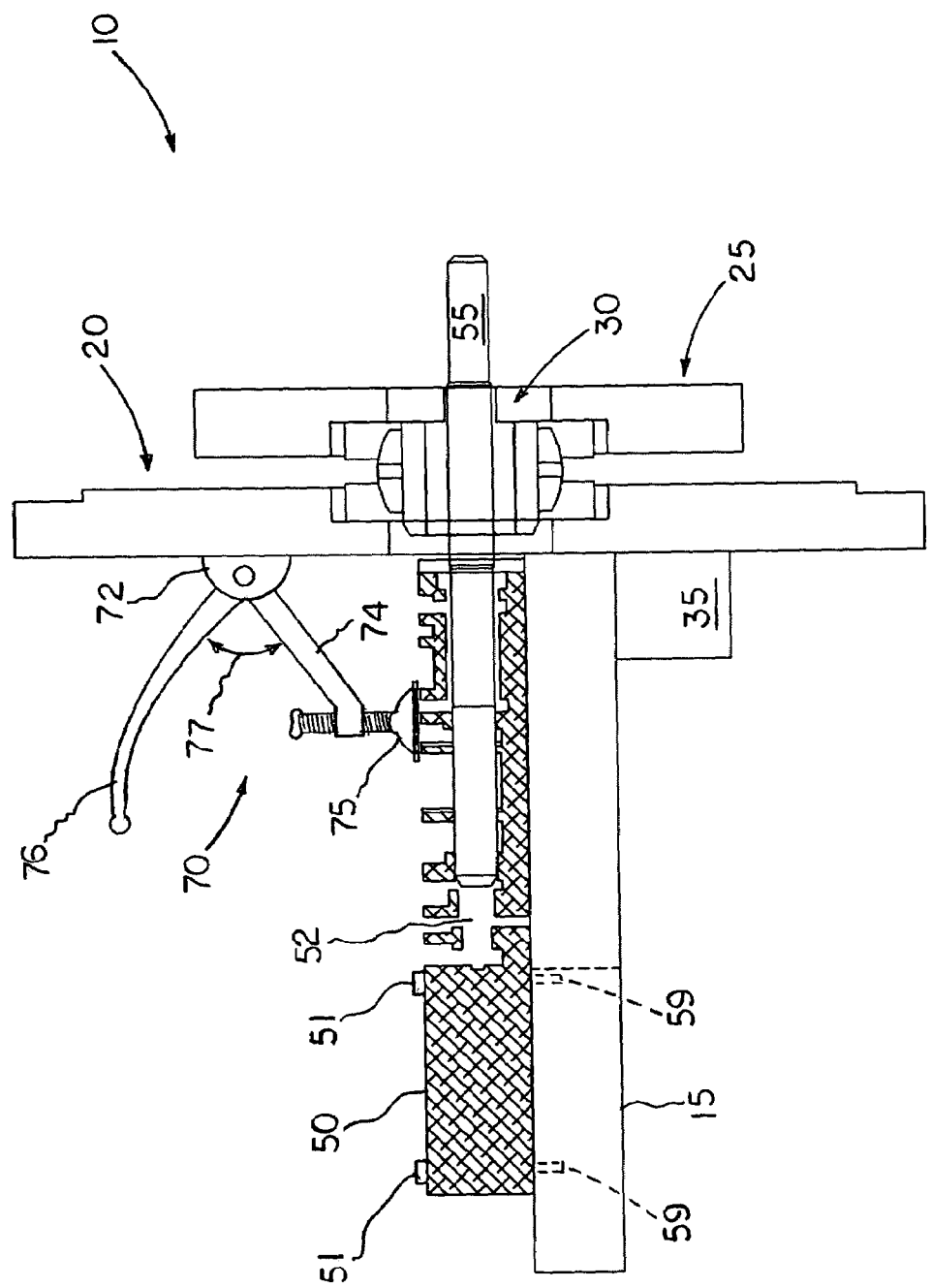
FIG. 7 is a side elevational view of the universal jig/work holding fixture illustrating the reaming process being performed on a valve body attached thereto.

Still referring to FIG. 5A a cylindrical adapter 48 is fitted to the inside diameter of bearing element 46, which is fitted, in turn, with a reamer or drill guide bushing 49 wherein a reamer 55 or drill bit is received (FIG. 7). Thus, the longitudinal axis of reamer 55 may be rotated/deflected in relation to the axis -A- within the limits of travel of bearing element 46 to be positioned in alignment with a bore 52 for the reaming process.

Figure 5B:
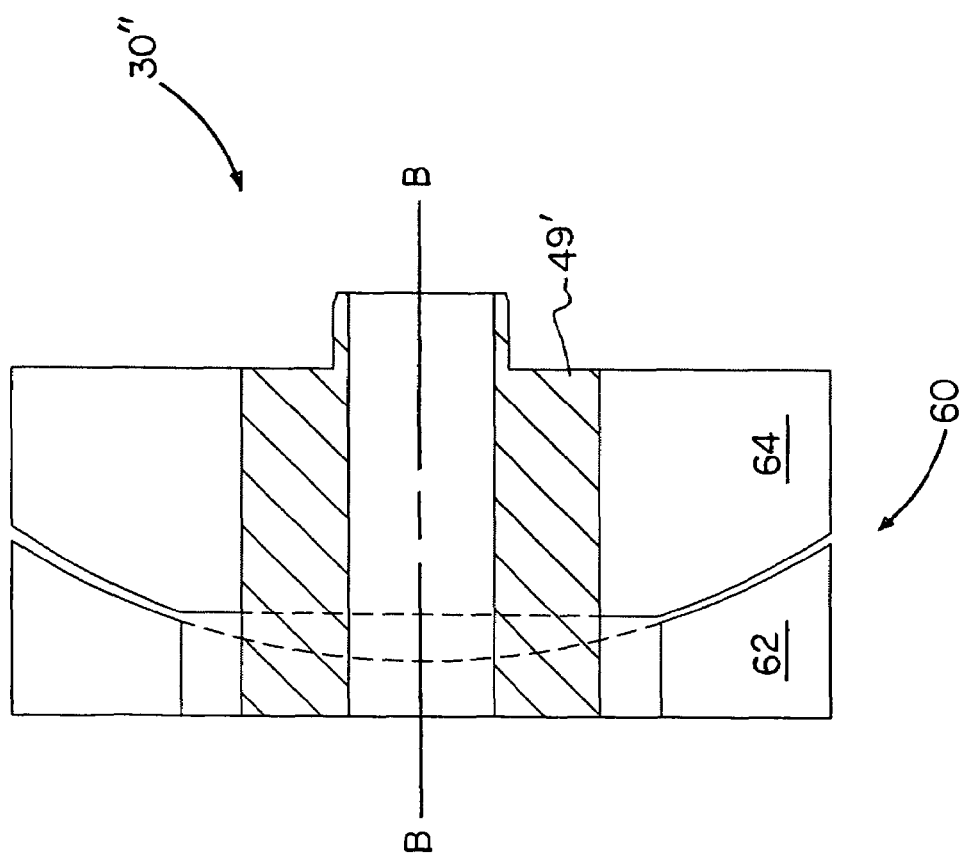
FIG. 5B is a cross-sectional view of another embodiment of the tool holder assembly of the universal jig/work holding fixture including a two-piece spherical washer.

In another embodiment tool holder 30" is comprised of a so-called spherical washer assembly, indicated generally at 60, comprising a concave half-section 62 and a mating convex half-section 64 as shown in FIG. 5B. In this embodiment the convex surface of half-section 64 engages the mating concave surface of half-section 62, which imparts universal rotation/angular deflection of the convex half-section 64 relative to a fixed longitudinal axis -B- of the concave half-section 62. A spherical washer manufactured by Reid Tool Supply, Muskegon, Mich. and identified by Part No. SPW-11 is suitable for this application.

Still referring to FIG. 5B a reamer or drill guide bushing 49' is fitted to the inside diameter of convex half-section 64 of the washer 30', wherein a reamer 55 is received. Thus, the longitudinal axis of reamer 55 may be rotated/deflected in relation to axis -B- within the limits of travel of half-section 64 to be positioned in alignment with a bore 52 for the reaming process.

Figure 6:
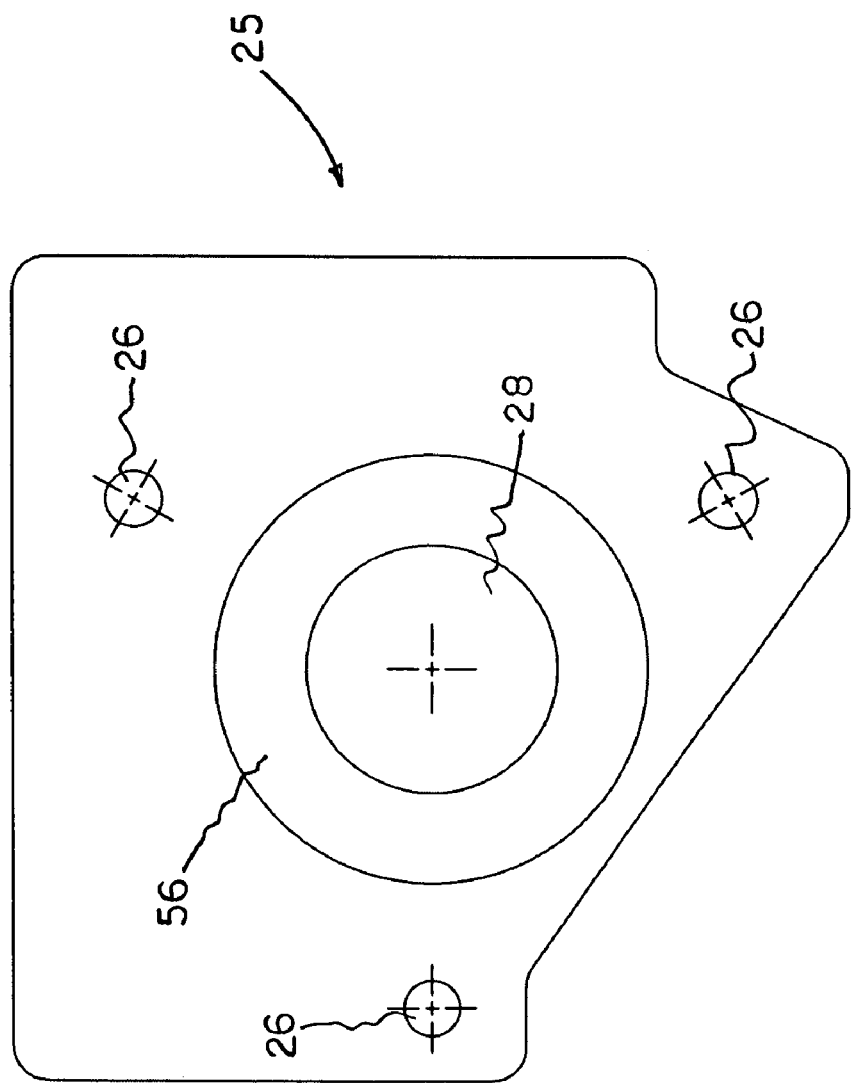
FIG. 6 is a plan view of the clamping plate of the present universal jig/work holding fixture.

Referring to FIG. 6 the clamping plate 25 is utilized to lock the bearing element 46 in position within the outer race 47 to prevent misalignment of reamer 55 to the bore 52 once the desired set-up is achieved. Alternatively, clamping plate 25 locks the convex half-section 64 in position against the concave half-section 62 of the washer assembly 30' once set-up is complete (FIG. 5B). This is accomplished by mounting the clamping plate 25 on threaded studs 12 projecting from jig plate 20 (FIG. 1) via holes 26 in the clamping plate and capturing a tool holder assembly 30 or 30" therebetween within the opposed counterbores 56, 57 formed in the clamping plate and the jig plate respectively.

Wing nuts 14 or other suitable fasteners are used to tighten the clamping plate 25 against the respective tool holder assemblies 30, 30". Once the clamping plate 25 is installed as shown in FIG. 1, the reamer guide bushing 49 is accessible through center opening 28 formed in the plate.

Another embodiment of the present jig/fixture is illustrated in FIG. 8, indicated generally at 10'. In this embodiment the jig/fixture 10' is also an assembly of components, namely, a bed, indicated generally at 15', a jig plate, indicated generally at 20', a clamping plate, indicated generally at 25', and the universal tool holder assembly, indicated generally at 30'. In this embodiment it will be noted that the mounting bracket 35 (FIG. 3) has been omitted.

As shown in FIG. 8, the bed 15' is a generally rectangular structure having a cutout 16' formed along its centerline and extending inwardly from a first lateral edge 15b' thereof. Cutout 16' provides access for applying cutting fluid during the reaming process. The bed 15' includes a flat, machined surface 15a' whereon the valve body 50, a transmission pump (not shown), or other work piece is secured during the reaming process.

Jig plate 20' is disposed in perpendicular relation to the bed 15' and attached thereto in fixed relation by machine screws 21, which extend through holes in the jig plate 20' and are engaged in threaded holes 43 formed in the bed 15'. Jig plate 20' is also provided with flats 20a, 20b, which permit the assembled jig/work holding fixture 10' to be held in a standard bench vise (not shown).

In the embodiment shown in FIG. 8, jig plate 20' is also provided with structures comprising height-adjusting means including, but not limited to, the following structures. The jig plate 20' includes an elongated central opening 23' formed between elongated adjustment slots 56', 57' wherein a universal tool holder 30' is positioned to receive a reaming tool 55. This configuration allows sliding adjustment of the vertical height of the tool holder assembly 30' in relation to the bed 15' during set-up without the pivoting mechanism of the previous embodiment (FIG. 4) as hereinafter explained in further detail.

Tool holder 30' is also comprised of a spherical bearing (as shown and described hereinabove in FIG. 5A), which includes an inner bearing element 46' and an outer race, which is divided into half-sections 47*a*', 47*b*' along the mid-circumferential plane thereof. In this embodiment the half-sections 47*a*', 47*b*' are machined from solid stock and the mounting rings 53, 54 of the previous embodiment (FIG. 5A) are effectively integrated into the outer race sections 47*a*', 47*b*'.

Half-sections 47*a*', 47*b*' are seated in the opposed, elongated adjustment slots 56', 57' formed in clamping plate 25' and jig plate 20' respectively. It will be appreciated that the elongated adjustment slots 56', 57' provide a wider range of vertical adjustment of tool holder 30' in relation to the bed 15' than in the previous embodiment (FIG. 1). Thus, the pivoting mechanism (i.e. pivot bolt 22 and curved slot 25) provided in the previous embodiment (FIG. 4) is omitted in this version.

Still referring to tool holder 30' shown in FIG. 8, a cylindrical adapter 48 as shown in FIG. 5A is fitted to the inside diameter of bearing element 46', which is fitted, in turn, with a reamer or drill guide bushing 49 wherein a reamer 55 or drill bit is received. Thus, the longitudinal axis of reamer 55 disposed within tool holder 30' may be rotated/deflected in relation to the axis -A- within the limits of travel of bearing element 46' to be positioned in alignment with a bore 52 in a valve body 50 (FIG. 7) for the reaming process as described hereinabove.

Clamping plate 25' provides structures comprising locking means including, but not limited to, the following structures. Still referring to FIG. 8 the clamping plate 25' functions to lock the bearing element 46' in position within the outer race half-sections 47*a*', 47*b*' to prevent misalignment of reamer 55 to the bore 52 once the desired set-up is achieved. This is accomplished by mounting the clamping plate 25' on threaded studs 12' projecting from jig plate 20' via holes 26' in the clamping plate 25' and capturing tool holder assembly 30' therebetween within the opposed adjustment slots 56', 57' formed in the clamping plate and the jig plate respectively. Wing nuts 14 (FIG. 1) or other suitable fasteners are used to tighten the clamping plate 25' against the tool holder assembly 30'. Once the clamping plate 25' is installed, the reamer guide bushing 49 (FIG. 5A) is accessible through the elongated center opening 28' formed in the plate 25'.

The universal jig/holding fixtures 10, 10' described hereinabove may be provided with structures comprising workholding means including, but not limited to, the following structures. In the embodiment shown in FIG. 7, the universal jig/fixture 10 is provided with a mechanical clamping apparatus, indicated generally at 70. Clamping apparatus 70 includes a mounting bracket 72, which is mechanically attached to either jig plate 20, 20' as shown. The clamping apparatus 70 also includes an adjustable foot member 75, which engages a pivoting leg member 74 to hold the valve body 50 or other work piece in place during the reaming process. A pivoting lever arm 76 is drawn downwardly/upwardly as shown by directional arrow 77 to engage or, alternatively, release the clamping apparatus 70 by spring actuation or other similar mechanism.

In the alternative, mechanical clamps such as C-clamps (not shown) may be used to secure the valve body 50 in the position shown in FIG. 7. The valve body 50 may also be secured at the desired position on the bed 15 by machine bolts 51 (FIG. 7), which extend through existing holes in the valve body 50 and engage threaded holes 59 formed in the bed 15 at predetermined locations.

In practical use the jig/work holding fixture 10 or 10' to be used is initially secured in a bench vise or otherwise clamped to a workbench or machine table. Next, the approximate vertical height corresponding to the bore 52 in the valve body (FIG. 7) to be reamed or drilled oversize is set. If using the jig/fixture 10 this is accomplished by adjusting the angular orientation of the bed plate 15 to the jig plate 20 to set the approximate vertical height between the bed plate 15 and the tool holder 30 as described hereinabove. If the jig/fixture 10' is utilized the tool holder assembly 30' is adjusted vertically within the elongated adjustment slots 56', 57' between the jig plate 20' and the clamping plate 25' to the approximate vertical height of the bore 52 to be reamed.

Thereafter, a guide pin (not shown) having a terminal end conforming to the inside diameter of the OE bore 52 is inserted through a reamer guide bushing 49, 49' in the tool holder assemblies 30, 30' and into the bore 52. Next, the clamping plate 25 or 25' to be used is mounted on the threaded studs 12, 12' and engaged loosely by advancing wing nuts 14 to capture the tool holder assembly 30 or 30' in the desired position. Thereafter, the position of the tool holder assembly 30 or 30' is fine adjusted by the technician until the guide pin rotates freely in the reamer guide bushing 49, 49' indicating that the bore 52 and the reamer guide bushing are in concentric alignment.

It will be appreciated that the tool holder assemblies 30, 30' can be moved either vertically or horizontally relative to bed plates 20, 20' within their respective counterbores 56, 57 or adjustment slots 56', 57' to position the tool holder assembly on the same axial centerline as the bore 52 to be reamed. A common white lithium grease may be applied to the abutting surfaces of the half-sections 47*a*, 47*b* or 47*a*', 47*b*' of the outer race and the adjustment slots 56', 57' in the case of tool holders 30, 30' or, in the alternative, to the abutting surfaces of the half-sections 62, 64 and the counterbores 56, 57 in the case of tool holder 30". The tool holder assemblies 30, 30', or 30" float in this position within the adjustment slots 56', 57' or counterbores 56, 57 respectively until clamped tight. Next, the guide pin is withdrawn from the reamer guide bushing 49, 49' and replaced by reamer 55 or drill bit to carry out the reaming process.

Although not specifically illustrated in the drawings, it should be understood that additional equipment and structural components will be provided as necessary and that all of the components described above are arranged and supported in an appropriate fashion to form a complete and operative Universal Jig/Work Holding Fixture incorporating features of the present invention.

Those skilled in the art will appreciate that the conception upon which this disclosure is based may readily be utilized as a basis for the designing of other structures, methods, and systems for carrying out the purposes of the present invention. For example, the present Universal Jig/Work Holding Fixture 10 can be adapted to repair hydraulic valve bores in a transmission case, which may require service. Further, with the bed plate 15 removed, the present jig/holding fixture 10 can be fastened directly to a transmission case or to any other bore that requires precision alignment/centering. In addition, the present universal jig/work holding fixture may be adapted for use with a powered reaming apparatus to control the speed and feed rates of the reamer. It is important, therefore, that the claims be regarded as including such equivalent constructions insofar as they do not depart from the spirit and scope of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. A universal jig/work holding fixture for use in combination with a reaming tool, said universal jig/work holding fixture comprising:
   a bed plate having a flat surface for mounting a work piece thereon;
   a jig plate attached in perpendicular relation to said bed plate, said jig plate including height-adjusting means for positioning said reaming tool relative to said work piece;
   a tool holder assembly including universal swiveling means to permit coaxial alignment of said reaming tool to a bore in said work piece; and
   a clamping plate detachably secured to said jig plate such that said tool holder assembly is captured between said jig plate and said clamping plate to prevent movement of said tool holder assembly after setting alignment to said bore.

2. A universal jig/work holding fixture of claim 1 wherein said bed plate includes a cutout section extending from a first lateral edge thereof along its centerline to permit application of cutting fluid during use.

3. A universal jig/work holding fixture of claim 1 wherein said height adjusting means includes a pair of opposed adjustment slots formed in said jig plate and said clamping plate respectively, wherein said tool holder is movable within said adjustment slot relative to said bed plate to set alignment of said reaming tool to said bore.

4. A universal jig/work holding fixture of claim 1 wherein said height adjusting means includes a pivot bolt extending through said jig plate and engaging a threaded hole formed in said bed plate thereby imparting angular rotation of said jig plate about said pivot bolt to provide vertical adjustment of said tool holder in relation to said bed plate.

5. A universal jig/work holding fixture of claim 4 wherein said height adjusting means further includes a locking bolt extending through a curved slot formed in said jig plate, wherein said curved slot is located at a predetermined radial dimension from an axis of said pivot bolt, said locking bolt extending through said curved slot and engaging a threaded hole formed in said bed plate, said locking bolt being tightened to lock said bed plate at a desired angular orientation relative to said jig plate.

6. A universal jig/work holding fixture of claim 1 wherein said universal swiveling means comprises a spherical bearing wherein said reaming tool is disposed.

7. A universal jig/work holding fixture of claim 6 wherein said spherical bearing further includes an inner bearing element and an outer race, wherein said outer race is divided into half-sections along a mid-circumferential plane thereof.

8. A universal jig/work holding fixture of claim 7 wherein said tool holder further includes a reaming tool guide bushing disposed within said spherical bearing in concentric relation thereto.

9. A universal jig/work holding fixture of claim 1 wherein said clamping plate includes locking means for securing said tool holder assembly in position to prevent misalignment of said reaming tool once a desired set-up is obtained.

10. A universal jig/work holding fixture of claim 1 wherein said locking means comprises a plurality of wing nuts engaged on mating threaded studs projecting from said jig plate and extending through said clamping plate, wherein said wing nuts are manually tightened against said clamping plate to capture said tool holder assembly in position.

11. The universal jig/work holding fixture of claim 1 wherein said jig plate further includes work-holding means for securing said work piece to said bed plate.

12. The universal jig/work holding fixture of claim 11 wherein said work holding means comprises a mechanical clamping apparatus attached to said jig plate, wherein said clamping apparatus includes a lever arm that is manually operated to clamp said work piece to said bed plate.

13. A universal reaming device for an automotive transmission valve body, said reaming device comprising:
   a reaming apparatus; and
   a jig/work holding fixture further comprising a bed plate having a flat surface for mounting a work piece thereon, a jig plate attached to said bed plate in perpendicular relation thereto, wherein said jig plate includes height-adjusting means for positioning said reaming apparatus relative to said work piece, a tool holder assembly including universal swiveling means to permit coaxial alignment of said reaming apparatus to a bore in said work piece, and a clamping plate detachably secured to said jig plate such that said tool holder assembly is captured between said jig plate and said clamping plate to prevent movement of said tool holder assembly after alignment of said reaming apparatus to said bore is established.

14. The universal reaming device of claim 13 wherein said reaming apparatus includes at least one reamer guide bushing disposed within said tool holder assembly, said reaming apparatus further including a reaming tool disposed within said at least one reamer guide bushing.

15. The universal reaming device of claim 13 wherein said height adjusting means includes a pair of opposed adjustment slots formed in said jig plate and said clamping plate respectively, wherein said tool holder assembly is movable within said adjustment slots relative to said bed plate to establish alignment of said reaming apparatus to said bore.

16. The universal reaming device of claim 13 wherein said universal swiveling means comprises a spherical bearing wherein said reaming apparatus is disposed.

17. The universal reaming device of claim 13 wherein said clamping plate includes a locking means for securing said tool holder assembly in position to prevent misalignment of said reaming apparatus after alignment thereof is established.

18. The universal reaming device of claim 17 wherein said locking means comprises a plurality of wing nuts engaged on mating threaded studs projecting from said jig plate and extending through said clamping plate, wherein said wing nuts are manually tightened against said clamping plate to capture said tool holder assembly therebetween.

19. The universal reaming device of claim 13 wherein said jig plate further includes work-holding means for securing said work piece to said bed plate.

20. The universal reaming device of claim 19 wherein said work holding means comprises a mechanical clamping apparatus attached to said jig plate, wherein said clamping apparatus includes a lever arm that is manually operated to clamp said work piece to said bed plate.

21. A method of reaming a bore in a work piece utilizing a jig/work holding fixture including an adjusting means for positioning a reaming tool in concentric relation to said bore, said jig/work holding fixture further comprising a bed plate having a flat surface for mounting said work piece thereon, a jig plate attached to said bed plate in perpendicular relation thereto, a tool holder assembly including a universal swiveling means to provide concentric alignment of said reaming tool to said bore, and a clamping plate detachably secured to said jig plate to prevent movement of said tool holder assembly after alignment of said reaming tool to said bore, said method comprising the steps of:

positioning said work piece on said universal jig/work holding fixture;

capturing said tool holder assembly including said universal swiveling means between said jig plate and said clamping plate;

aligning said reaming tool in concentric relation to said bore; and reaming said bore to a predetermined size.

22. The method of claim 21 wherein the step of positioning further includes the step of holding said work piece in position with a mechanical work-holding means.

23. The method of claim 21 wherein the step of aligning further includes the steps of:

adjusting the position of said tool holder assembly to an interim position approximately concentric to said bore;

inserting a guide pin of a predetermined size into said tool holder assembly such that said guide pin extends into said bore;

swiveling said guide pin within said tool holder assembly until said guide pin rotates freely within said bore to confirm concentric alignment therebetween; and locking said tool holder assembly in concentric alignment.

24. The method of claim 21 wherein the step of reaming further includes the steps of:

removing said guide pin from said tool holder assembly; and inserting said reaming tool into said tool holder assembly to carry out the reaming process.

* * * * *